US010053623B2

(12) United States Patent
Yang et al.

(10) Patent No.: US 10,053,623 B2
(45) Date of Patent: Aug. 21, 2018

(54) ALKALI HALIDE SCINTILLATOR AND USES THEREOF

(71) Applicants: SAINT-GOBAIN CERAMICS & PLASTICS, INC., Worchester, MA (US); SAINT-GOBAIN CRISTAUX & DETECTEURS, Courbevoie (FR)

(72) Inventors: Kan Yang, Solon, OH (US); Julien LeJay, Rueil Malmaison (FR); Samuel Blahuta, Fontenay-sous-Bois (FR); Vladimir Ouspenski, Saint-Pierre-les-Nemours (FR)

(73) Assignees: SAINT-GOBAIN CERAMICS & PLASTICS, INC., Worcester, MA (US); SAINT-GOBAIN CRISTAUX & DETECTEURS, Les Miroirs (FR)

( * ) Notice: Subject to any disclaimer, the term of this patent is extended or adjusted under 35 U.S.C. 154(b) by 0 days.

(21) Appl. No.: 15/474,230

(22) Filed: Mar. 30, 2017

(65) Prior Publication Data
US 2017/0283696 A1    Oct. 5, 2017

(30) Foreign Application Priority Data

Mar. 30, 2016  (FR) .................................. 16 52716
Aug. 16, 2016  (FR) .................................. 16 57770

(51) Int. Cl.
*C09K 11/62*   (2006.01)
*G01T 3/06*    (2006.01)
*G01T 1/202*   (2006.01)

(52) U.S. Cl.
CPC .......... *C09K 11/628* (2013.01); *G01T 1/2023* (2013.01); *G01T 3/06* (2013.01)

(58) Field of Classification Search
CPC ........ C09K 11/628; G01T 1/2023; G01T 3/06
See application file for complete search history.

(56) References Cited

U.S. PATENT DOCUMENTS

| 4,884,288 | A | 11/1989 | Sowerby |
| 8,871,115 | B2 | 10/2014 | Ouspenski |
| 9,417,343 | B1 * | 8/2016 | Bhandari ........... C09K 11/7733 |
| 2010/0254500 | A1 | 10/2010 | Taleyarkhan |
| 2011/0204243 | A1 | 8/2011 | Bendahan et al. |
| 2012/0326043 | A1 | 12/2012 | Duraj |
| 2015/0115144 | A1 | 4/2015 | Yang et al. |

FOREIGN PATENT DOCUMENTS

WO    2012142365 A2    10/2012

OTHER PUBLICATIONS

Nagarkar et al., "New structured scintillators for neutron radiography", Physics Procedia, 2015, vol. 69, pp. 161-168.

(Continued)

*Primary Examiner* — Hugh H Maupin
(74) *Attorney, Agent, or Firm* — Abel Law Group, LLP; Robert N. Young

(57) ABSTRACT

A scintillator can include a monocrystalline compound having a general formula $Na_{(1-y)}Li_yX$, where $0<y<1$ and X is at least one halogen or any combination of halogens. In an embodiment, the scintillator can have a Pulse Shape Discrimination Figure of Merit of at least 1 at a temperature of 25° C., at a temperature of 150° C., or both.

19 Claims, 12 Drawing Sheets

(56) References Cited

OTHER PUBLICATIONS

International Search Report for PCT/US2017/024978, dated Sep. 20, 2017, 2 pages.

Brubaker et al., Thermal neutron detection using alkali halide scintillators 6Li and pulse shape discrimination, 2011 IEEE Nuclear Science Symposium Conference Record, Oct. 23-29, 2011, pp. 2006-2009.

Khan et al., Scintillation characterization of thallium-doped lithium iodide crystals, Nuclear Instruments and Methods in Physics Research A, May 8, 2015, pp. 31-34, vol. 793, Elsevier.

Li et al., Theoretical and experimental investigation of solid-solution scintillator material properties in the model system of Tl+ activated NaBrxI(1-x) and Na(1-x)KxI, Jun. 9, 2014, Wake Forest University, US.

Menge et al., Behavior of Cs2LiYCl6:Ce scintillator up to 175° C., Nuclear Science Symposium and Medical Imaging Conference, 2011 IEEE, 2011, pp. 1598-1601.

Nagarkar et al., Lithium alkali halides—new thermal neutron detectors with n-γ discrimination, 2013 IEEE Nuclear Science Symposium Conference Record, Oct. 27, 2011-Nov. 2, 2013, pp. 1-4.

\* cited by examiner

ALKALI HALIDE SCINTILLATOR AND USES THEREOF

CROSS-REFERENCE TO RELATED APPLICATIONS

This application claims priority under 35 U.S.C. § 119(a) to, and incorporates herein by reference in its entirety for all purposes, French application FR1657770, filed Aug. 16, 2016, entitled "ALKALI HALIDE SCINTILLATOR AND USES THEREOF", to Kan Yang, et al. and which is assigned to the current assignee hereof. This application also claims priority under 35 U.S.C. § 119(a) to, and incorporates herein by reference in its entirety for all purposes, French application FR1652716, filed Mar. 30, 2016, entitled "ALKALI HALIDE SCINTILLATOR AND USES THEREOF," to Kan Yang et al. and which is assigned to the current assignee hereof.

FIELD OF THE DISCLOSURE

The present disclosure is directed to scintillators and methods of using such scintillators.

BACKGROUND

Scintillator-based detectors are used in a variety of applications, including research in nuclear physics, oil exploration, field spectroscopy, container and baggage scanning, and medical diagnostics. When a scintillator material of the scintillator-based detector is exposed to ionizing radiation, the scintillator material captures energy of incoming radiation and scintillates, emitting the captured energy in the form of photons. A photosensor of the scintillator-based detector detects the emitted photons. Radiation detection apparatuses can analyze pulses for many different reasons. Continued improvements are desired.

BRIEF DESCRIPTION OF THE DRAWINGS

Embodiments are illustrated by way of example and are not limited in the accompanying figures.

Figure 1:
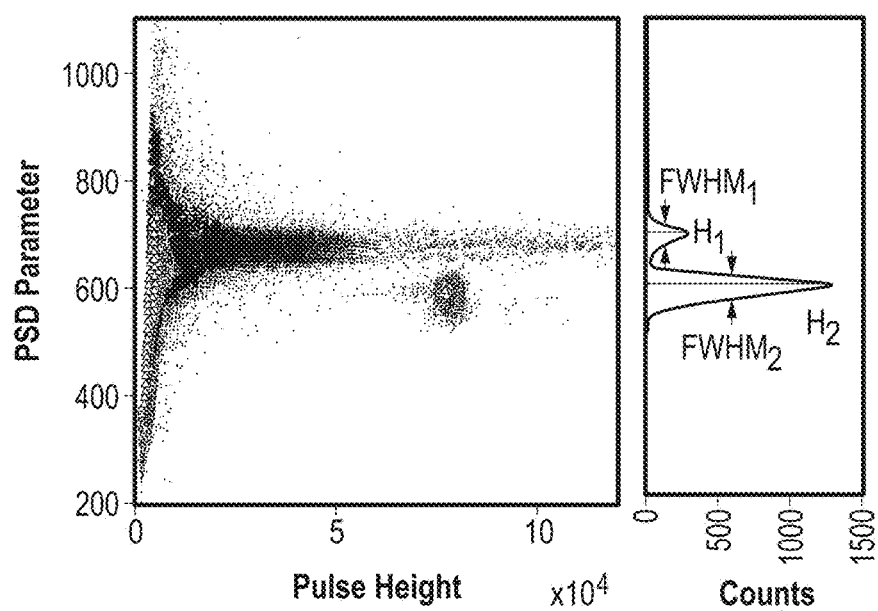
FIG. 1 includes a plot of pulse shape discrimination parameter as a function of pulse height on the left-hand side and as a function of scintillation counts on the right-hand side.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

As used herein, the terms "comprises," "comprising," "includes," "including," "has," "having," or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

The use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise.

Unless otherwise stated, the content of different components of the scintillator compound described herein refers to the content of the crystal, as opposed to the melt.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the scintillation and radiation detection arts.

A scintillator as described herein can achieve improved distinction between neutrons and gamma radiation by exhibiting an increased difference in decay time between a neutron pulse and a gamma radiation pulse. For example, in an embodiment, the scintillator can exhibit a difference in decay time between a neutron pulse and a gamma radiation pulse having an absolute value of at least 33 ns, or at least 35 ns, or at least 37 ns, or at least 39 ns. In an embodiment, the scintillator can exhibit a difference in decay time between a neutron pulse and a gamma radiation pulse having an absolute value of at most 55 ns, or at most 53 ns, or at most 51 ns. Moreover, the difference in decay time between a neutron pulse and a gamma radiation pulse can have an absolute value in a range of any of the above minimum and maximum values, such as 33 to 55 ns, or 35 to 53 ns. For example, the decay time of the neutron pulse can be faster than the decay time of the gamma radiation pulse.

In view of the above, the scintillator described herein can be used in a dual-mode neutron and gamma radiation detection apparatus, and can provide suitable pulse shape discrimination (PSD) over a wide range of temperatures including a temperature of −40° C. up to 200° C. or even greater, such as a temperature of at least 25° C., or at least 50° C., or at least 100° C., and up to at least 125° C., or at least 150° C., or at least 175° C., or at least 200° C. or even greater. The radiation detection apparatus can exhibit suitable light output performance when exposed to a wide range of temperatures including a temperature of −40° C. up to 200° C., or even greater, such as a temperature of at least 25° C., or at least 50° C., or at least 100° C., and up to at least 125° C., or at least 150° C., or at least 175° C., or at least 200° C. or even greater.

In an embodiment, the scintillator compound includes an alkali halide. The alkali halide can be doped with an activator. Further, the alkali halide can be co-doped with the alkali metal and an activator. The co-doping with the alkali metal can improve decay time, light yield, energy resolution, proportionality, another suitable scintillation parameter, or any combination thereof. In an embodiment, the concentration of alkali dopant, the activator, or the ratio of the alkali dopant to activator can be controlled to obtain good scintillation performance.

In an embodiment, the alkali of the alkali halide can include sodium and the alkali dopant can include lithium. For example, the scintillator compound can have the following general formula (i):

(i) $Na_{(1-y)}Li_yX$, where $0<y<1$ and X is at least one halogen or any combination of halogens.

In an embodiment, 'y' can be at least 0.005, or at least 0.01, or at least 0.02, or at least 0.03. In further embodiments, 'y' can be at most 0.1, or at most 0.09, or at most 0.08. Moreover, 'y' can be in a range of any of the above minimum and maximum values, such as 0.005 to 0.1.

In a more particular embodiment, the scintillator compound can include Li that is enriched with $^6Li$ so that $^6Li$ makes up more than 7% of the total Li content. In a particular embodiment, $^6Li$ makes up at least 70%, or at least 80%, or at least 90% of the total Li content. In another embodiment, the scintillator compound can include Li wherein $^6Li$ makes up at most 7% of the total Li content. In one embodiment, the scintillator compound has a stoichiometric composition, and in another embodiment, the scintillator compound has a non-stoichiometric composition.

Further, the scintillator compound can include an activator dopant. The activator dopant can be present in the scintillator compound in an amount of at least 0.03 mol %, or at least 0.1 mol %, or at least 0.2 mol %, or at least 0.3 mol %. In an embodiment, increasing the concentration of the activator in the scintillator compound may decrease performance of the scintillator with respect to PSD. Thus, in certain embodiments, the activator dopant may be present in an amount of at most 1 mol %, or at most 0.9 mol %, or at most 0.8 mol %, based on the total weight of the scintillator compound. Moreover, the activator dopant can be present in the scintillator compound in a range of any of the above minimum and maximum values, such as 0.03 mol % to 1 mol %, or 0.1 mol % to 0.8 mol %. In certain embodiments, the activator dopant can include either a post-transition metal, such as thallium, or a lanthanide, such as europium, but not a combination of thallium and europium. In an embodiment, the gamma radiation pulse decay time of a scintillator described herein can be affected by the concentration of co-dopants in the scintillator compound. In an embodiment, the gamma radiation pulse decay time for a scintillator compound including Li-doped NaI:Tl can be longer than the gamma radiation pulse decay time for a scintillator compound including NaI:Tl having the same Tl concentration but without the Li co-dopant. Further, the decay time of the gamma radiation pulse can decrease as the content of Li in the scintillator compound increases. For example, the Li-doped NaI:Tl can have a gamma radiation pulse decay time of at least 230 ns, or at least 250 ns or at least 300 ns, at a temperature of 22° C. In another embodiment, the gamma radiation pulse decay time for a scintillator compound including Li-doped NaI:Tl can be less than the pulse decay time for a scintillator compound including NaI:Tl with the same Tl concentration but without the Li co-dopant, such as when the Li-doped NAI:Tl includes additional co-dopants. For example, in a particular embodiment, the Li-doped NaI:Tl with at least one additional co-dopant may have a gamma radiation pulse decay time of at most 200 ns, or at most 190 ns, or at most 180 ns, or at most 170 ns.

In an embodiment, as discussed above, the scintillator compound including Li-doped NaI:Tl or NaI:Eu can additionally include at least one additional co-dopant. The additional co-dopant can include an alkali metal, such as K, Rb, Cs; an alkaline earth, such as Mg, Ca, Sr, Ba; a rare earth, such as La, Lu, Yb, Ce, Tb, Sc, or Y; a transition metal, such as Cr; a post-transition metal, such as In; or any combination thereof.

In an embodiment, the scintillator compound can be in the form of a crystal grown according to the Bridgman-Stockbarger technique, the Czochralski technique, the Kyropoulos technique, the Edge-defined Film Growth (EFG) technique, the Gradient Freeze technique, or the like. In a particular embodiment, the crystal growth can employ continuous feeding in the form of a melt or a powder. Further, the growth method can produce a monocrystalline compound. In an embodiment, the monocrystalline compound can be finished and utilized as a monocrystalline scintillator compound. In another embodiment, the monocrystalline compound can be plastically deformed to make a polycrystalline scintillator compound. For example, the crystal can be formed according to the process disclosed in U.S. Pat. No. 8,871,115 to Vladimir Ouspenski, entitled "Process of forming a luminescent material," which is incorporated herein by reference in its entirety.

In an embodiment, the monocrystalline scintillator compound including Li co-doped NAI:Tl can achieve unexpectedly improved performance over a polycrystalline scintillator compound including Li co-doped NAI:Tl. In addition, a polycrystalline scintillator compound derived from an originally-formed monocrystalline compound including Li co-doped NAI:Tl can achieve unexpectedly improved performance over an originally-formed polycrystalline compound including Li co-doped NAI:Tl. Existing technology has not succeeded in obtaining suitable PSD for gamma radiation and neutrons using a scintillator including polycrystalline NaI scintillator compound. In *Thermal neutron detection using alkali halide scintillators $^6Li$ and pulse shape discrimination* (2011 IEEE Nuclear Science Symposium Conference Record), Brubaker et al. ("Brubaker") found that a scintillator including a polycrystalline NaI(Li,Tl) scintillator compound exhibits poor neutron light yield and PSD, and concludes that the polycrystalline NaI(Li,Tl) scintillator compound exhibits insufficient gamma rejection. Similarly, in *Lithium alkali halides—new thermal neutron detectors* with n-γ discrimination (2013 IEEE Nuclear Science Symposium Conference Record), Nagarkar et al. ("Nagarkar") discloses that a scintillator including a polycrystalline NaI (Li) scintillator compound produced similar decay properties for both neutrons and gamma radiation and, thus, did not exhibit suitable PSD.

Unexpectedly, the inventors have developed a monocrystalline compound including Li co-doped NAI:Tl that can exhibit improved performance. In an embodiment, the monocrystalline compound can have increased transparency. In addition, a polycrystalline scintillator compound derived from the monocrystalline compound can have a reduced void content that can maintain the increased transparency. In an embodiment, the scintillator compound can have a void content of at most 0.1%, or at most 0.5%, or at most 2%, based on the material density of the scintillator compound. Without being bound to a particular theory, the inventors believe that the increased transparency in the scintillator compound assists in achieving an improved PSD that Brubaker and Nagarkar could not achieve.

The improved performance for dual mode applications in conjunction with PSD can be demonstrated by a PSD Figure of Merit (FOM). A scintillator can be exposed to a neutron source, and the electronic pulse received by the analyzer device is processed using a fast Fourier transform to obtain a value for a PSD parameter. The PSD parameter may be determined by the time it takes for the electronic pulse to rise from 2% to 60% of its maximum intensity. Other integration ranges may be used for other scintillating compounds. For example, the PSD parameter may be determined by the time it takes for the electronic pulse to rise from 2% to 50% or 10% to 90% of its maximum intensity. As a matter of illustration, FIG. 1 includes a plot of pulse height versus PSD parameter closer to the left-hand side of FIG. 1 and a plot of pulse count versus PSD parameter closer to the right-hand side of FIG. 1. In FIG. 1, $H_1$ corresponds to the peak of the gamma radiation pulses, and $H_2$ corresponds to the peak of the thermal neutron pulses as illustrated in a plot closer to the right-hand side of FIG. 1. $H_1$ and $H_2$ are expressed in units of PSD parameter using the Y-axis of the left-hand plot. Thus, $H_1$ is 700 in units of the PSD parameter, and $H_2$ is 594 in units of the PSD parameter. A full width of half maximum (FWHM) can be obtained from the peaks in the right-hand plot and also be expressed in units of PSD parameter. $FWHM_1$ corresponds to the FWHM for $H_1$ and has a value of 37 units of the PSD parameter, and $FWHM_2$ corresponds to the FWHM for $H_2$ and has a value of 42 units of the PSD parameter.

As used herein, PSD FOM is defined by the following equation:

$$|(H_1-H_2)|/(FWHM_1+FWHM_2).$$

$H_1$, $H_2$, $FWHM_1$, $FWHM_2$ are all in units of the PSD parameter, and therefore, PSD FOM is dimensionless. For the plot in FIG. 1, the sample scintillator has a PSD FOM of 1.34. The PSD FOM of compositions described herein can be analyzed is a similar manner. As PSD FOM gets larger, the PSD is more accurate and the possibility of pulse misclassification is reduced. On the other hand, as PSD FOM gets smaller, PSD is more difficult and the possibility of pulse misclassification is increased.

In an embodiment, the scintillator compound described herein can have a PSD FOM that is greater than a NAI:Tl scintillator having the same Tl concentration without a Li co-dopant. For example, the scintillator compound described herein can have a PSD FOM at 25° C. of at least 1.1, or at least 1.3, or at least 1.5. In an embodiment, the scintillator compound can have a PSD FOM of at 25° C. of at most 6, or at most 5, or at most 4. The scintillator compound can have the above PSD FOM at 25° C. at a Li concentration of at least 0.5 mol %, or at least 2 mol %, or at least 4 mol %, or at least 8 mol %.

Further, the scintillator compound can have a PSD FOM that is at least 1.5 at a temperature of at least 50° C., or at least 75° C., or at least 100° C., or at least 125° C., or at least 150° C., or at least 175° C. In an embodiment, the scintillator compound described herein can have a PSD FOM at 50° C. of at least 2, or at least 2.5, or at least 3. In an embodiment, the scintillator compound described herein can have a PSD FOM at 75° C. of at least 2, or at least 2.5, or at least 3. In an embodiment, the scintillator compound described herein can have a PSD FOM at 100° C. of at least 2, or at least 2.5, or at least 3. In an embodiment, the scintillator compound described herein can have PSD FOM at 125° C. of at least 1.7, or at least 2.1, or at least 2.5. In an embodiment, the scintillator compound described herein can have a PSD FOM at 150° C. of at least 1.1, or at least 1.3, or at least 1.5.

Further, an advantage of certain embodiments of the scintillator described herein includes introducing neutron sensitivity to an NaI, NAI:Tl, or NaI:Eu scintillator by doping the scintillator compound with the Li. In an embodiment, a Li co-doped NaI scintillator compound can achieve suitable PSD for dual mode detection of neutrons and gamma radiation at room temperature and in high temperature environments, such as at a temperature of about 50° C. to at least about 200° C.

Another advantage of certain embodiments of the scintillator described herein includes achieving a Li co-doped NaI or NaI:Tl or NaI:Eu scintillator compound that can exhibit substantially no decrease in performance with respect to light output and gamma-ray energy at 25° C. and an increase in such performance at high temperatures in a range of about 50° C. up to about at least 200° C., as compared to a NaI:Tl scintillator having the same Tl concentration but without a Li co-dopant. In an embodiment, the scintillator compound comprising NaI:Tl co-doped with Li has a light output at 25° C. or greater, such as at a temperature of at least 50° C., or at a temperature of at least 75° C., or at a temperature of at least 100° C., or at a temperature of at least 125° C., or at a temperature of at least 150° C., or at least 175° C., or at least 200° C., that is greater than a light output of a NaI:Tl scintillator having the same Tl concentration but without a Li co-dopant.

In an embodiment, the energy resolution of the scintillator compound described herein can have an energy resolution comparable to a NaI:Tl scintillator compound, particularly when the Li concentration is in a range of from greater than 0 mol % up to about 8 mol % in the crystal. For example, the scintillator compound described herein can have an energy resolution at 662 keV in a range of from 6% to about 8%, or more particularly in a range of 6.2% to 7.6%.

In a further embodiment, the scintillator can have a gamma rejection of at most $1\times10^{-6}$, or at most $5\times10^{-7}$, or at most $1\times10^{-7}$ false neutron detections per gamma ray detection over the range of 2.0 to 4.0 MeV gamma ray equivalent energy.

In an embodiment, the scintillator can be a large scintillator. In an embodiment, the scintillator can have a width of at least 15 mm, at least 25 mm, or at least 50 mm, or at least 75 mm, at least 90 mm, or at least 100 mm. In another embodiment, the scintillator can have a volume of at least 500 cm$^3$, or at least 750 cm$^3$, or at least 1000 cm$^3$, or at least 1500 cm$^3$, or at least 2000 cm$^3$. In an embodiment, the scintillator described herein does not include a thin film scintillator, such as a scintillator having a thickness of no greater than 10 mm.

Further, in an embodiment, the scintillator described herein does not include a size-limited crystal, such as an elpasolite. A rare earth elpasolite can have a general formula of: $M_1{}^{1+}{}_2M_2{}^{+1}REX_6$, where $M_1{}^{1+}$ is an element having a relatively large size cation belonging to Group 1 elements, in particular Cs, Rb, K and also Na; and $M_2{}^{1+}$ is an element having a relatively small size of cation belonging to Group 1 elements, in particular Li or Na. RE is one or more rare earth elements; and X is one or more halide elements. Due to the multiple species within an elpasolite, the size of an elpasolite crystal can be limited.

Any of the scintillators as previously described can be used in a variety of applications, including research in nuclear physics, oil exploration, field spectroscopy, container and baggage scanning, and medical diagnostics. Exemplary applications include radiation detectors for a security detection apparatus, an oil well-logging detector apparatus, a gamma ray spectroscopy apparatus, an isotope identification apparatus, a public area detector apparatus, a large area survey apparatus, a baggage and cargo scanning apparatus, a Single Positron Emission Computer Tomography (SPECT) apparatus or a Positron Emission Tomography (PET) apparatus, an x-ray imaging apparatus, a portal monitor radiation detector apparatus, a handheld radiation detector apparatus, a personal radiation detector apparatus.

Figure 2:
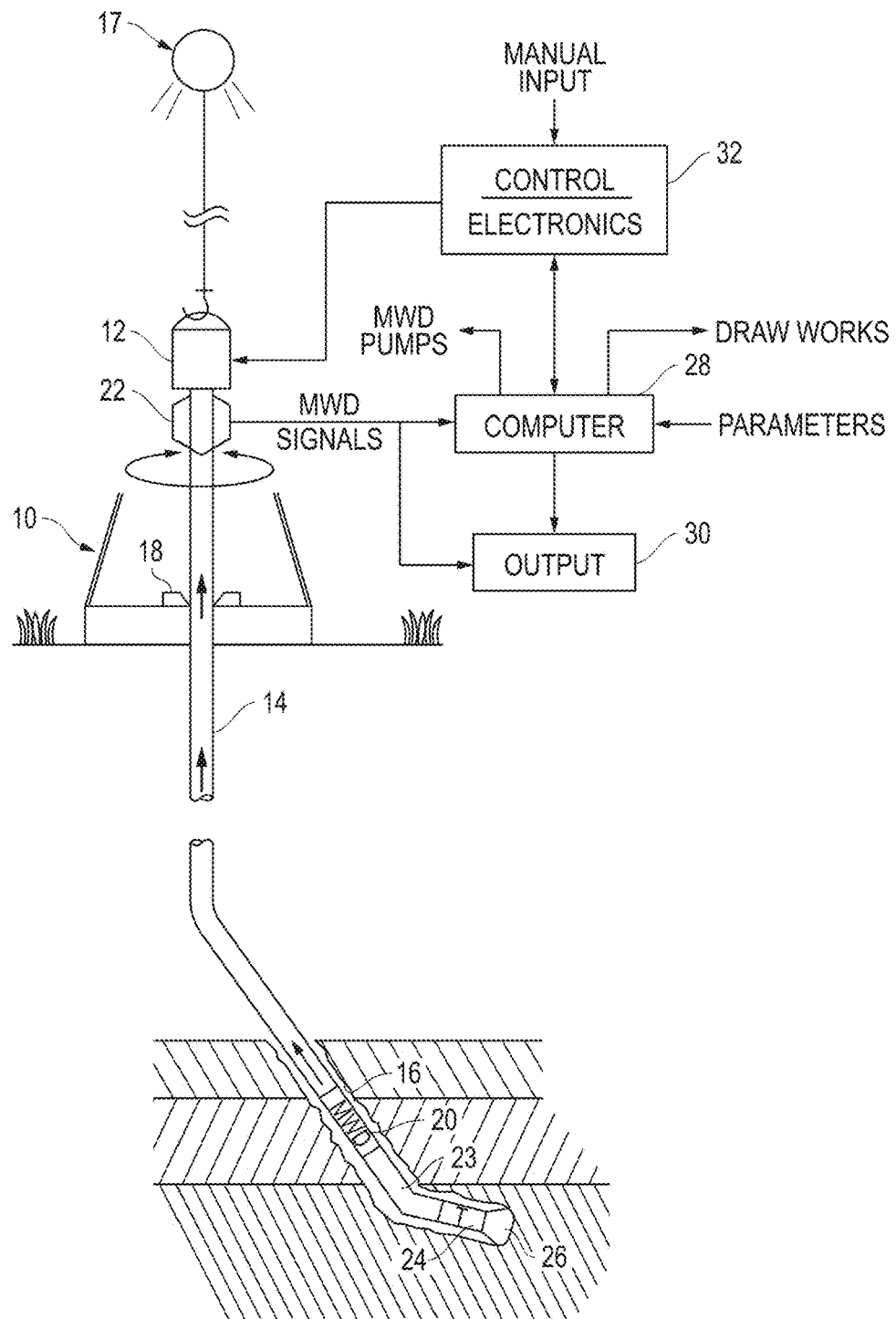
FIG. 2 includes a depiction of a scintillator installed within a radiation detection device according to an embodiment described herein.

FIG. 2 includes a depiction of a drilling apparatus 10 that includes a top drive 12 connected to an upper end of a drill string 14 that is suspended within a well bore 16 by a draw works 17. A rotary table, including pipe slips, 18 can be used to maintain proper drill string orientation in connection with or in place of the top drive 12. A downhole telemetry measurement and transmission device 20, commonly referred to as a measurement-while-drilling (MWD) device, is part of a downhole tool that is connected to a lower end of the drill string 14. The MWD device transmits drilling-associated parameters to the surface by mud pulse or electromagnetic transmission. These signals are received at the surface by a data reception device 22. The downhole tool includes a bent section 23, a downhole motor 24, and a drill bit 26. The bent section 23 is adjacent the MWD device for assistance in drilling an inclined well bore. The downhole motor 24, such as a positive-displacement-motor (PDM) or downhole turbine, powers the drill bit 26 and is at the distal end of the downhole tool. b The downhole signals received by the data reception device 22 are provided to a computer 28, an output device 30, or both. The computer 28 can be located at the well site or remotely linked to the well site. An analyzer device can be part of the computer 28 or may be located within the downhole tool near the MWD device 20. The computer 28 and analyzer device can include a processor that can receive input from a user. The signals may also be sent to an output device 30, which can be a display device, a hard copy log printing device, a gauge, a visual audial alarm, or any combination thereof. The computer 28 is operatively connected to controls of the draw works 17 and to control electronics 32 associated with the top drive 12 and the rotary table 18 to control the rotation of the drill string and drill bit. The computer 28 may also be coupled to a control mechanism associated with the drilling apparatus mud pumps to control the rotation of the drill bit. The control electronics 32 can also receive manual input, such as a drill operator.

Figure 3:
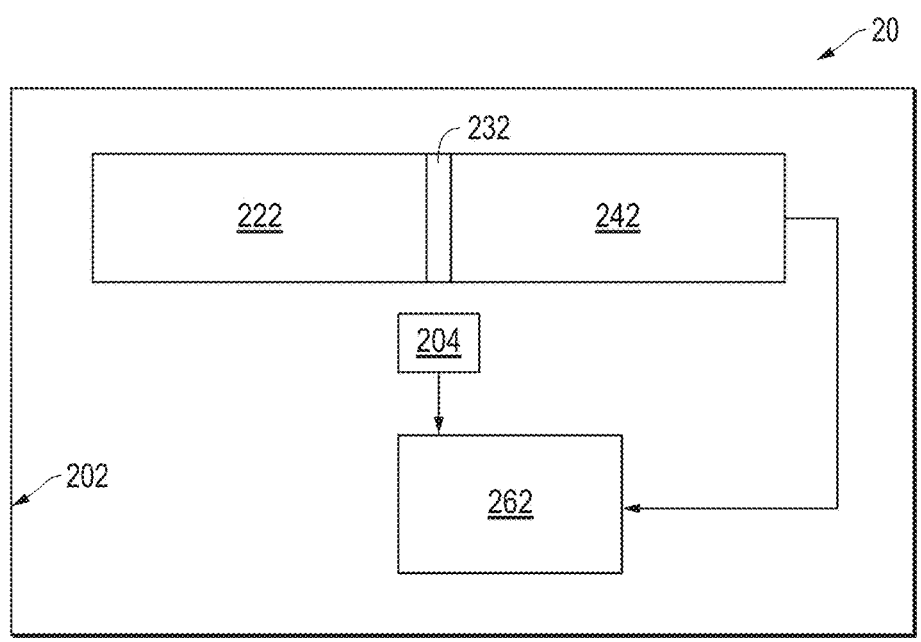
FIG. 3 includes a depiction of a measurement-while-drilling device according to an embodiment described herein.

FIG. 3 illustrates a depiction of a portion of the MWD device 20 within the downhole tool 16. The MWD device 20 includes a housing 202, a temperature sensor 204, a scintillator 222, an optical interface 232, a photosensor 242, and an analyzer device 262. The housing 202 can include a material capable of protecting the scintillator 222, the photosensor 242, the analyzer device 262, or a combination thereof, such as a metal, metal alloy, other material, or any combination thereof. The temperature sensor 204 is located adjacent to the scintillator 222, the photosensor 242, or both. The temperature sensor 204 can include a thermocouple, a thermistor, or another suitable device that is capable of determining the temperature within the housing over the normal operating temperature of the MWD device 20. A radiation detection apparatus can include the scintillator 222, the photosensor 242 that is optically coupled to the scintillator 222, and the analyzer device 262 optically coupled to the photosensor 242. Although illustrated here as part of an MWD device, a person of ordinary skill in the art after reading this disclosure would recognize that the radiation detection apparatus can be used in other applications, such as the other applications mentioned above.

The scintillator 222 can include any of the scintillator compounds described above. In a particular embodiment, the scintillator 222 can include a scintillator compound having a composition that is well-suited for high temperature applications, such as applications operating at a temperature in a range of 50° C. to 200° C. or even greater, such as of at least 50° C., or at least 75° C., or at least 100° C. and up to at least 125° C., or at least 150° C., or at least 175° C., or at least 200° C., or even greater. In a further embodiment, the scintillator 222 can include a scintillator compound having a composition such that the PSD FOM is sufficiently high to allow pulse shape discrimination to be used so that neutrons and gamma radiation can be counted separately, even at the high temperatures described above.

In summary, the scintillator 222 can have a PSD FOM that allows for pulse shape discrimination, a composition may include a Br-containing or an I-containing alkali halide, or both having the PSD FOM and composition.

Returning to FIG. 3, the scintillator 222 and the photosensor 242 are optically coupled to the optical interface 232. The optical interface 232 can include a polymer, such as a silicone rubber, that is used to mitigate the refractive indices difference between the scintillator 222 and the photosensor 242. In other embodiments, the optical interface 232 can include gels or colloids that include polymers and additional elements.

The photosensor 242 can be a photomultiplier tube (PMT), a semiconductor-based photomultiplier (SiPM), a hybrid photosensor, or any combination thereof. The photosensor 242 can receive photons emitted by the scintillator 222 and produce electronic pulses based on numbers of photons that it receives. The photosensor 242 is electrically coupled to the analyzer device 262. Although not illustrated in FIG. 3, an amplifier may be used to amplify the electronic signal from the photosensor 242 before it reaches the analyzer device 262.

The analyzer device 262 can include hardware and can be at least partly implemented in software, firmware, or a combination thereof. In an embodiment, the hardware can include a plurality of circuits within a field programmable gate array (FPGA), application specific integrated circuit (ASIC), another integrated circuit or on a printed circuit board, or another suitable device, or any combination thereof. The analyzer device 262 can also include a buffer to temporarily store data before the data are analyzed, written to storage, read, transmitted to another component or device, another suitable action is performed on the data, or any combination thereof. In the embodiment illustrated in FIG. 4, the analyzer device 262 can include an amplifier 422 coupled to the photosensor 242 (in FIG. 3), such that an electronic pulse from the photosensor 242 can be amplified before analysis. The amplifier 422 can be coupled to an analog-to-digital converter (ADC) 424 that can digitize the electronic pulse. The ADC 424 can be coupled to a pulse shape discrimination (PSD) module 442. In a particular embodiment, the PSD module 442 can include a FPGA or an ASIC. In a particular embodiment, the PSD module 442 can include circuits to analyze the shape of the electronic pulse and determine whether the electronic pulse corresponds to a neutron or gamma radiation. In a more particular embodiment, the PSD module 442 can use the electronic pulse, the temperature from the temperature sensor 204, or a derivative of such information, with a look-up table to determine whether the electronic pulse corresponds to a neutron or gamma radiation. The look-up table can be part of the FPGA or ASIC or may be in another device, such as an integrated circuit, a disk drive, or a suitable persistent memory device.

The analyzer device 262 further comprises a neutron counter 462 and a gamma radiation counter 464. If the PSD module 442 determines that an electronic pulse corresponds to a neutron, the PSD module 442 increments the neutron counter 462. If the PSD module 442 determines that an electronic pulse corresponds to gamma radiation, the PSD module 442 increments the gamma radiation counter 464.

In an alternative embodiment, part or all of the components and functions provided by the analyzer device 262 can be located outside the well bore, either at the well drilling site or remote to the well drilling site, such as in an office building.

Figure 4:
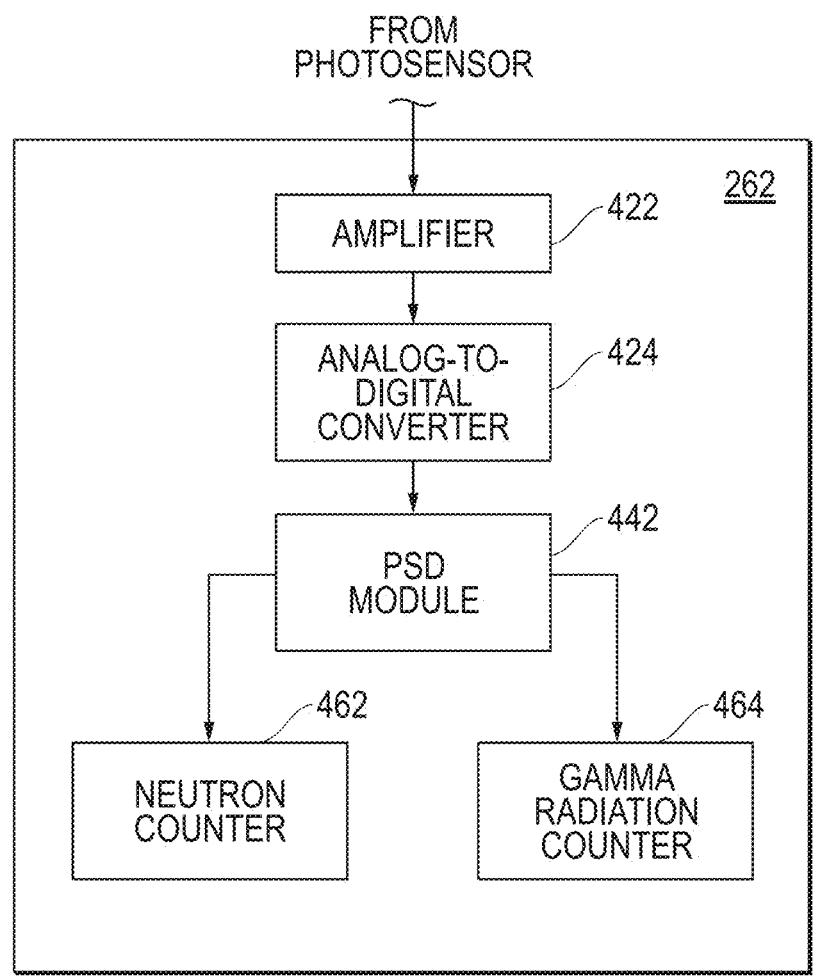
FIG. 4 includes a depiction of an analyzer device of the measurement-while-drilling device of FIG. 3.
Figure 5:
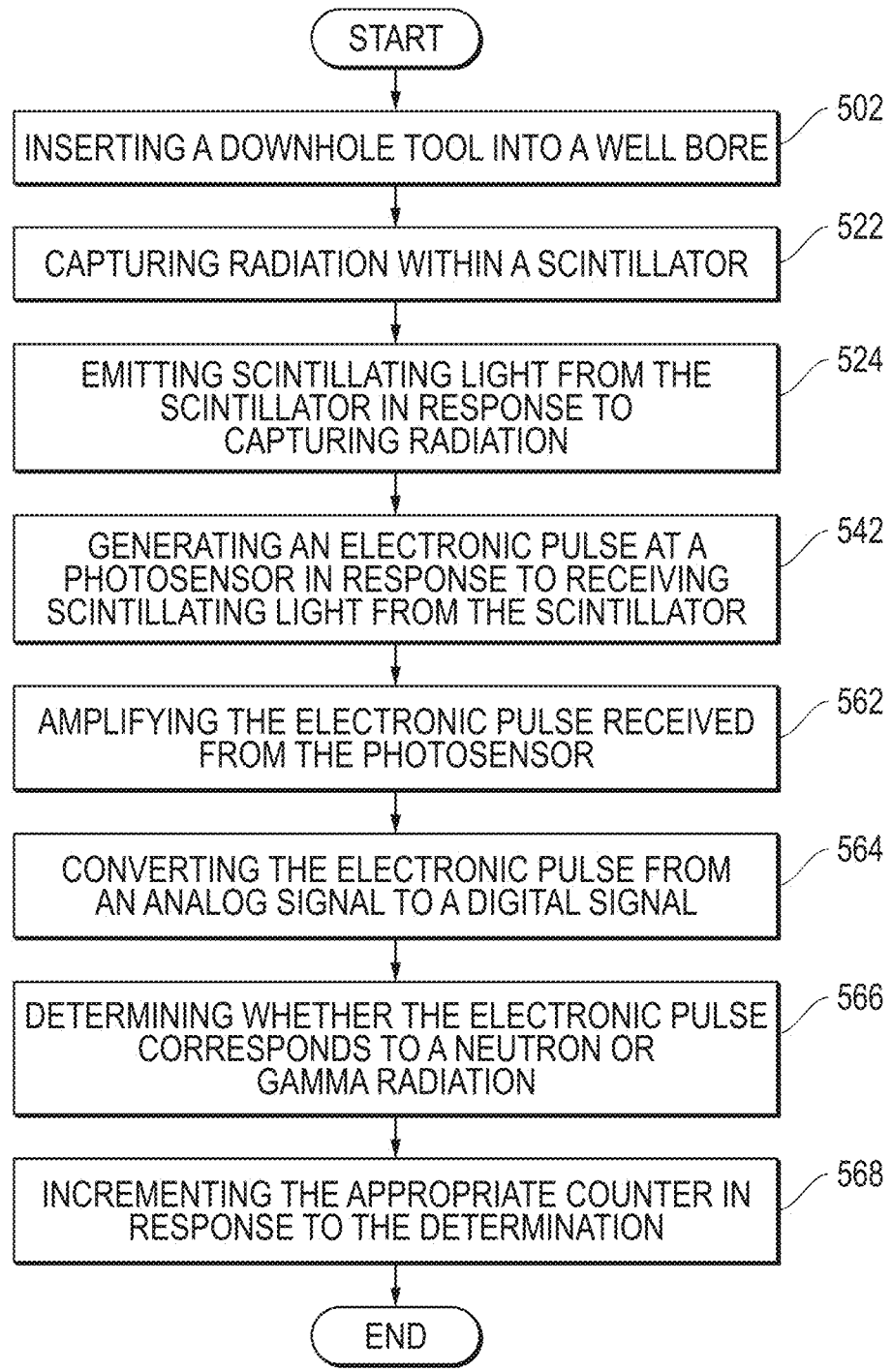
FIG. 5 includes a flow chart of a process of using the measurement-while-drilling device of FIG. 3.

FIG. 5 includes a flowchart of an exemplary method of using the drilling apparatus as illustrated in FIG. 2 including the MWD device 20. The method will be described with respect to components within the drilling apparatus as illustrated in FIG. 2, the MWD device 262 as illustrated in FIG. 3, and the analyzer device as illustrated in FIG. 4. After reading this specification, skilled artisans will appreciate that activities described with respect to particular components may be performed by another component. Further, activities described with respect to particular components may be combined into a single component, and activities described with respect to a single component may be distributed between different components.

The method can begin with inserting the downhole tool into the well bore 16, at block 502 in FIG. 5. Referring to FIG. 2, the drill bit 26 can be activated by pumping mud down the drill string 14 to turn the downhole motor 24. For directional drilling, the orientation of the drill bit can be controlled using the top drive 12. When the direction of drilling is to continue along a straight line, the top drive 12 rotates drill string 14 while downforce pressure is exerted by the draw works 17. To change direction, the top drive 12 is used to position the tool face of the downhole tool. The downforce pressure may be reduced when the direction is being changed. After the tool face is in the correct position, the top drive 12 no longer rotates the drill string, as the bent section 23 causes the direction of drilling to change. The downforce pressure is increased on the bit 26 and drilling continues as the direction changes. After the proper direction is achieved, the top drive 12 is activated to rotate the drill string 14 so that further drilling continues in the new direction. During drilling significant heat can be generated, and the resulting temperature can be greater than 120° C., at least 130° C., at least 140° C., at least 150° C., or even higher. Also during drilling, data is collected by the MWD device 20. The scintillator 222 is selected so that at such temperatures, the scintillator 222 can generate different scintillating light corresponding to different types of radiation that is converted by the photosensor 242 into different types of electronic pulses depending on the type of radiation captured.

The method can include capturing radiation and emitting scintillating light, at blocks 522 and 524 in FIG. 5. The radiation can be captured by the scintillator 222, and the scintillating light can be emitted by the scintillator 222 in response to capturing the radiation. The method can further include generating an electronic pulse at the photosensor 242 in response to receiving scintillating light from the scintillator 222, at block 542. The electronic pulse can be provided by the photosensor 242 to the analyzer device 262. The method can further include amplifying the electronic pulse, at block 562. The electronic signal may be amplified by a pre-amplifier or an amplifier within the photosensor 242 or the analyzer device 262. The method can also include converting the electronic pulse from an analog signal to a digital signal, at block 564.

The method can include processing data, if necessary, and determining whether electronic pulse corresponds to a neutron or gamma radiation, at block 566 in FIG. 5. In an embodiment, determination can be performed by an FPGA, an ASIC, or another suitable device. Analysis of the pulse can include processing data, if necessary, and determining a rise time of the pulse, a decay time, another suitable parameter that can be useful in making the determination, or any combination thereof. The determination can be performed using the PSD module 442. The PSD module 442 may use temperature information from the temperature sensor 204 as part of the determination. The method can further include incrementing the appropriate counter in response to the determination, at block 568. When the electronic pulse is determined to correspond to a neutron, the neutron counter 462 is incremented. When the electronic pulse is determined to correspond to gamma radiation, the gamma radiation counter 464 is incremented. This information can also be used to identify the source of the gamma radiation.

Referring to FIG. 5, some of the actions described with respect to blocks 562, 564, 566, and 568 can be performed by the analyzer device 262. All of the analyzer device 262 may be within the MWD device 20 or may be outside the well bore 16. In another embodiment, the amplifier 422 and ADC 424 may be within the MWD device 20, and the PSD module 442 and counters 462 and 464 may be located at the surface outside the well bore 16. After reading this specification, skilled artisans will be able to determine where the analyzer device or components of the analyzer device 262 are to be located in view of the PSD FOM of the scintillator for the normal operating temperatures, computational needs that may or may not depend on the PSD FOM or composition of the scintillator, and the particular application.

While the radiation detection apparatus is described with respect to a drilling apparatus, the radiation detection apparatus can be part of a well logging apparatus that does not perform a drilling operation. Similar to the downhole tool with the drill bit 26, the well logging apparatus can include a downhole tool without the drill bit. A flexible string may be coupled to the downhole tool to allow the downhole tool to be lowered and raised within the well bore 16. If needed or desired, a drill string may be coupled to the downhole tool.

The concepts as described herein allow for a better selection of a scintillator compound comprising a co-doped alkali halide, particularly a NaI:Tl scintillator compound co-doped with Li that can have an acceptable PSD FOM over the normal operating temperatures for an apparatus, whether at room temperature or the higher temperatures described herein. The acceptable PSD FOM allows the pulse shape discrimination to be used that will discriminate two different types of radiation and allow pulse shape discrimination to be tailored to a particular portion of an electronic pulse where differences between the different types of radiation are more distinct as compared to other portions of the electronic pulse. Further, the Li content in the co-doped NaI:Tl can be adjusted to achieve a scintillator compound for the scintillator to have a well suited PSD FOM for the particular portion of electronic pulses where distinctions between the different types of radiation are greater than other portions. The concepts described herein can be extended to other types of radiation, such as x-rays, alpha particles, beta particles, etc. and are not limited to neutrons and gamma radiation.

Many different aspects and embodiments are possible. Some of those aspects and embodiments are described herein. After reading this specification, skilled artisans will appreciate that those aspects and embodiments are only illustrative and do not limit the scope of the present invention. Additionally, those skilled in the art will understand that some embodiments that include analog circuits can be similarly implement using digital circuits, and vice versa. Embodiments may be in accordance with any one or more of the embodiments as listed below.

Embodiment 1

A scintillator comprising a monocrystalline compound having a general formula $Na_{(1-y)}Li_yX$, where $0<y<1$ and X is at least one halogen or any combination of halogens.

Embodiment 2

A scintillator having a Pulse Shape Discrimination Figure of Merit of at least 1.5 at a temperature of 22° C.

Embodiment 3

A scintillator having a Pulse Shape Discrimination Figure of Merit of at least 1.5 at a temperature of 150° C.

Embodiment 4

The scintillator of any one of embodiments 2 and 3, having a general formula $Na_{(1-y)}Li_yX$, where $0<y<1$ and X is at least one halogen or any combination of halogens.

Embodiment 5

The scintillator of any one of embodiments 1 and 4, wherein y is at least 0.005, or at least 0.01, or at least 0.02, or at least 0.03.

Embodiment 6

The scintillator of any one of embodiments 1, 4, and 5, wherein y is at most 0.1, or at most 0.09, or at most 0.08.

Embodiment 7

The scintillator of any one of the preceding embodiments, wherein the scintillator includes additional dopants comprising at least one of K, Rb, Cs, In, Mg, Ca, Sr, Ba, Sc, Y, La, Lu, Yb, Ce, Tb, Cr, and any combination thereof.

Embodiment 8

The scintillator of any one of the preceding embodiments, further comprising an activator dopant.

Embodiment 9

The scintillator of embodiment 8, wherein thallium is the only activator dopant.

Embodiment 10

The scintillator of embodiment 8, wherein europium is the only activator dopant.

Embodiment 11

The scintillator of any one of embodiments 8, 9 and 10, wherein the activator dopant is present in an amount of at least 0.03 mol %, or at least 0.1 mol %, or at least 0.2 mol %, or at least 0.3 mol %.

Embodiment 12

The scintillator of any one of embodiments 8 to 11, wherein the activator dopant is present in an amount of at most 1 mol %, or at most 0.9 mol %, or at most 0.8 mol %.

Embodiment 13

The scintillator of any one of embodiments 1 and 4 to 12, wherein the scintillator has a Pulse Shape Discrimination Figure of Merit of at least 1, or at least 1.2, or at least 1.3, at a temperature of 22° C.

Embodiment 14

The scintillator of any one of embodiments 1 and 4 to 12, wherein the scintillator has a Pulse Shape Discrimination Figure of Merit of at least 0.9, or at least 1.1, or at least 1.2, or at least 1.3, or at least 1.4 at a temperature of 150° C.

Embodiment 15

The scintillator of any one of the preceding embodiments, wherein the scintillator has a Pulse Shape Discrimination Figure of Merit of at most 5, or at most 4, or at most 3, at a temperature of 22° C.

Embodiment 16

The scintillator of any one of the preceding embodiments, wherein the scintillator has a Pulse Shape Discrimination Figure of Merit of at most 5, or at most 4, or at most 3, at a temperature of 150° C.

Embodiment 17

The scintillator of any one of the preceding embodiments, wherein the scintillator has a gamma rejection ratio of at most $1\times10^{-6}$, or at most $5\times10^{-7}$, or at most $1\times10^{-7}$ false neutron detections per gamma ray detection over the range of 2.0 to 4.0 MeV gamma ray equivalent energy.

Embodiment 18

The scintillator of any one of the preceding embodiments, wherein the scintillator comprises NaI:Tl co-doped with Li and has a light output at 22° C. or greater, such as at a temperature of at least 50° C., or at a temperature of at least 75° C., or at a temperature of at least 100° C., or a temperature of at least 125° C., or a temperature of at least 150° C., or a temperature of at least 175° C., or a temperature of at least 200° C. that is greater than a light output of a scintillator compound comprising a NaI:Tl having the same Tl concentration without a Li co-dopant.

Embodiment 19

The scintillator of any one of embodiments 1 and 4 to 18, wherein the Li includes enriched Li comprising $^6$Li in an amount of at least 30%, or at least 60%, or at least 90%, of the total Li content Embodiment 20

The scintillator of any one of embodiments 1 and 4 to 19, wherein the halogen includes bromine or iodine.

Embodiment 21

The scintillator of embodiment 20, wherein the halogen includes iodine.

Embodiment 22

The scintillator of any one of the preceding embodiments, wherein the scintillator has a width of at least 75 mm, at least 90 mm, or at least 100 mm.

Embodiment 23

The scintillator of any one of the preceding embodiments, wherein the scintillator has a volume of at least 500 cm$^3$, or at least 750 cm$^3$, or at least 1000 cm$^3$, or at least 1500 cm$^3$, or at least 2000 cm$^3$.

Embodiment 24

The scintillator of any one of the preceding embodiments, wherein the scintillator has a void content of at most 0.1%, or at most 0.5%, or at most 2%, based on the material density of the scintillator compound.

Embodiment 25

The scintillator of any one of the preceding embodiments, wherein the scintillator comprises a polycrystalline scintillator compound derived from an originally-formed monocrystalline compound.

Embodiment 26

A radiation detector comprising the scintillator of any one of the preceding embodiments.

Embodiment 27

The radiation detector of embodiment 26, further comprising a photosensor optically coupled to the scintillator.

Embodiment 28

The radiation detector of embodiment 27, further comprising an analyzer device, wherein the analyzer device is adapted to distinguish a first pulse from the photosensor from a second pulse from the photosensor, wherein the first pulse corresponds to a neutron as captured by the scintillator, and the second pulse corresponds to gamma radiation as captured by the scintillator.

Embodiment 29

The radiation detector of embodiment 28, wherein the analyzer device comprises a discrimination module that is configured to discriminate between the neutron and the gamma radiation using rise time, decay time, or a combination thereof.

Embodiment 30

The radiation detector of any one of embodiments 26 to 29, wherein the radiation detector is a portal monitor radiation detector, a handheld radiation detector, or a personal radiation detector.

Embodiment 31

The radiation detector of any one of embodiments 26 to 30, wherein the radiation detector is a dual mode radiation detector.

Embodiment 32

The radiation detector of embodiment 31, wherein the dual mode radiation detector detects neutrons and gamma radiation.

Embodiment 33

The radiation detector of any one of embodiments 26 to 32, wherein the radiation detector is at least part of a security detection apparatus, an oil well-logging detector apparatus, a gamma ray spectroscopy apparatus, an isotope identification apparatus, a public area detector apparatus, a large area survey apparatus, a baggage and cargo scanning apparatus, a Single Positron Emission Computer Tomography (SPECT) apparatus or a Positron Emission Tomography (PET) apparatus, an x-ray imaging apparatus, a portal monitor radiation detector apparatus, a handheld radiation detector apparatus, or a personal radiation detector apparatus.

Embodiment 34

An apparatus including a downhole tool configured to be inserted into a well bore and comprising the scintillator of any one of embodiments 1 to 25.

Embodiment 35

The apparatus of embodiment 34, further comprising a photosensor optically coupled to the scintillator.

Embodiment 36

The apparatus of embodiment 35, further comprising an analyzer device coupled to the photosensor, wherein the analyzer device is part of the downhole tool.

Embodiment 37

The apparatus of embodiment 35, further comprising an analyzer device coupled to the photosensor, wherein the analyzer device is configured to be operated outside of the well bore and spaced apart from the downhole tool.

Embodiment 38

The apparatus of any one of embodiments 35 to 37, further comprising a drill string coupled to the downhole tool.

EXAMPLES

The Examples are given by way of illustration only and does not limit the scope of the present invention as defined in the appended claims.

Example 1

Figure 6:
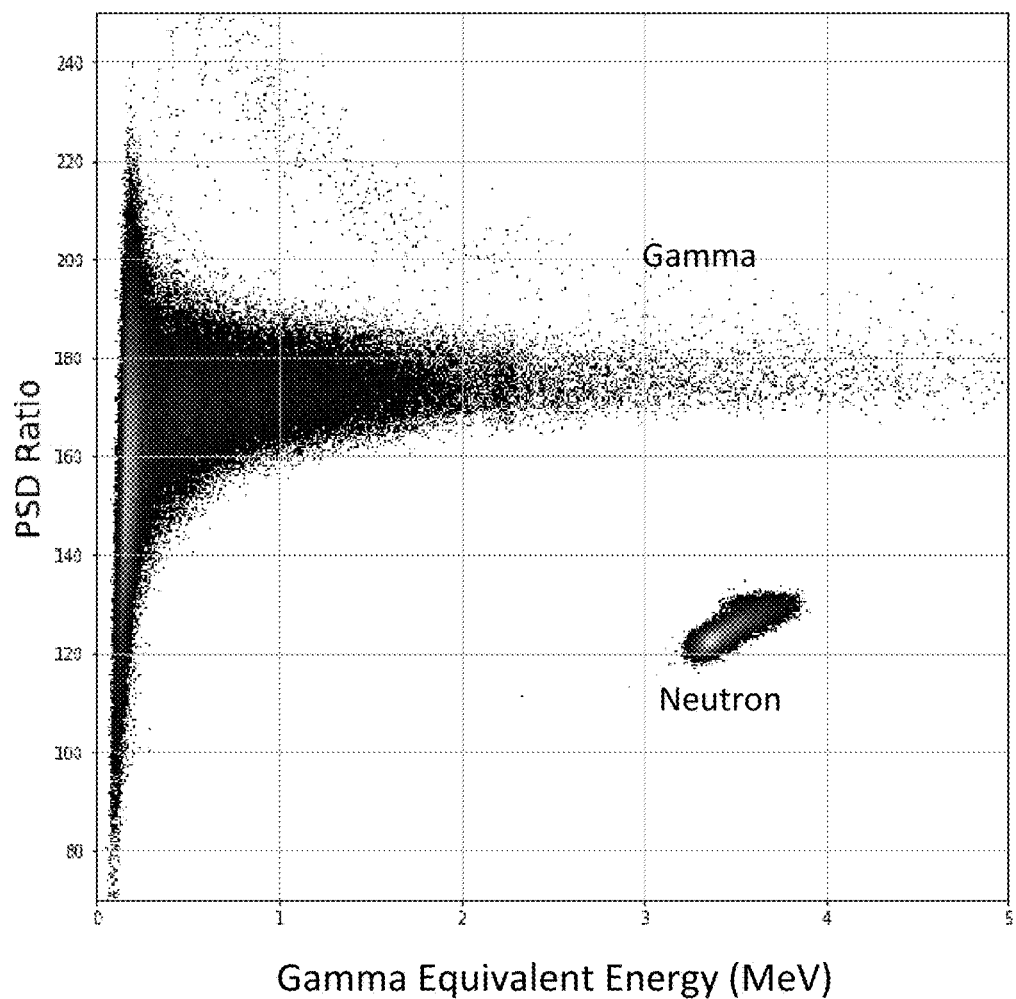
FIG. 6 includes a pulse shape discrimination density plot of all the scintillation pulses for Sample 1 of the Example Section.
Figure 7:
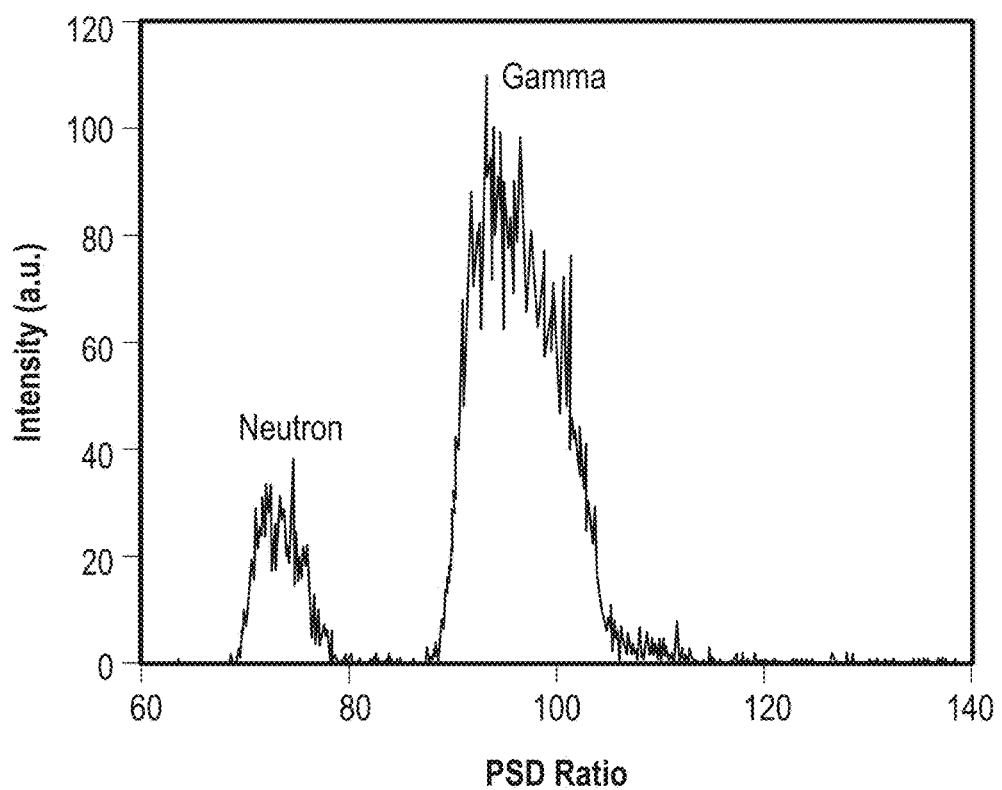
FIG. 7 includes a pulse shape discrimination spectrum of gamma and neutron pulses for Sample 1 of Example 1.

Data was collected on a monocrystalline scintillator compound, Sample 1, having the formula NaI (0.05 mol % Tl, 0.5 mol % Li) in the melt and NaI (0.06 mol % Tl, 0.4 mol % Li) in the crystal. The scintillator was exposed to $^{252}$Cf having a mass of approximately 109 nanogram and placed about 30 cm from the scintillator. The exposure was performed at about 22° C. Radiation captured by the scintillators caused scintillating light to be emitted that was collected by a photosensor, which in turn generated an electronic pulse. FIG. 6 includes a PSD density plot of all the scintillation pulses, and FIG. 7 includes a PSD spectrum of gamma and neutron pulses. As can be seen from FIG. 7, the separation between gamma radiation and neutrons is excellent. In particular, the PSD FOM is over 1.5, which corresponds to a gamma rejection ratio of $1 \times 10^{-8}$ false neutron detections per gamma ray detection over the range of 2.0 to 4.0 MeV gamma ray equivalent energy.

Example 2

Figure 8:
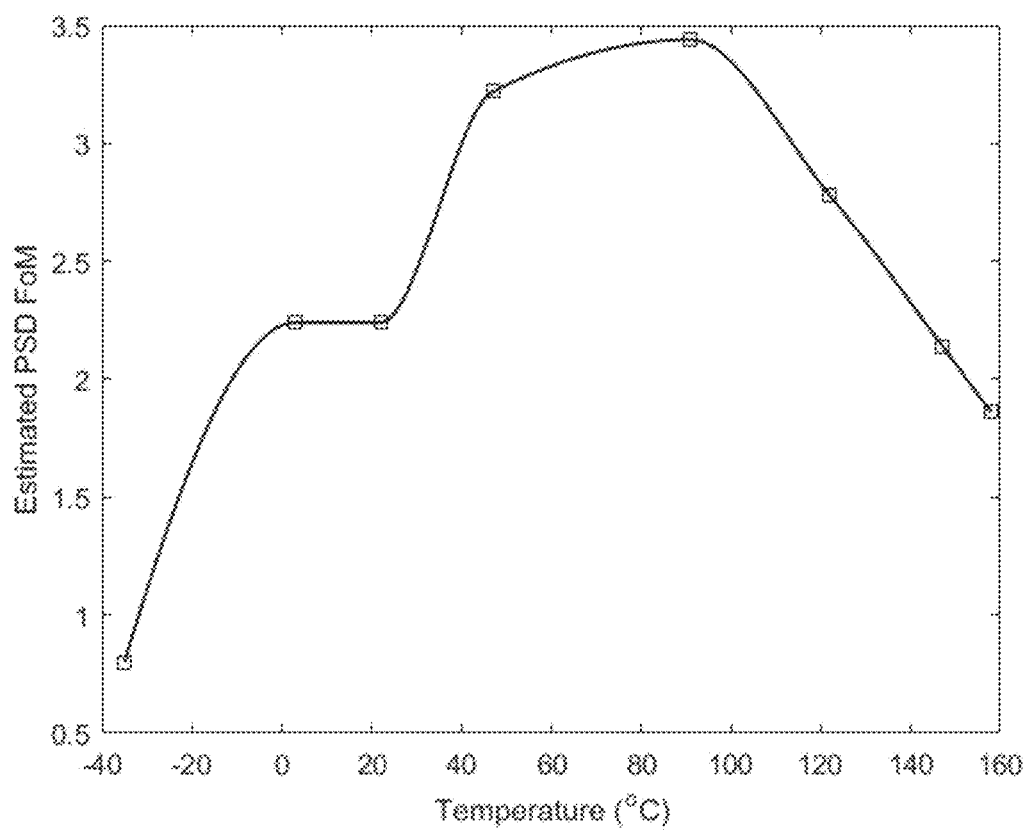
FIG. 8 includes a plot of estimated pulse discrimination figure of merit over a temperature range for Sample 2 of Example 2.
Figure 9:
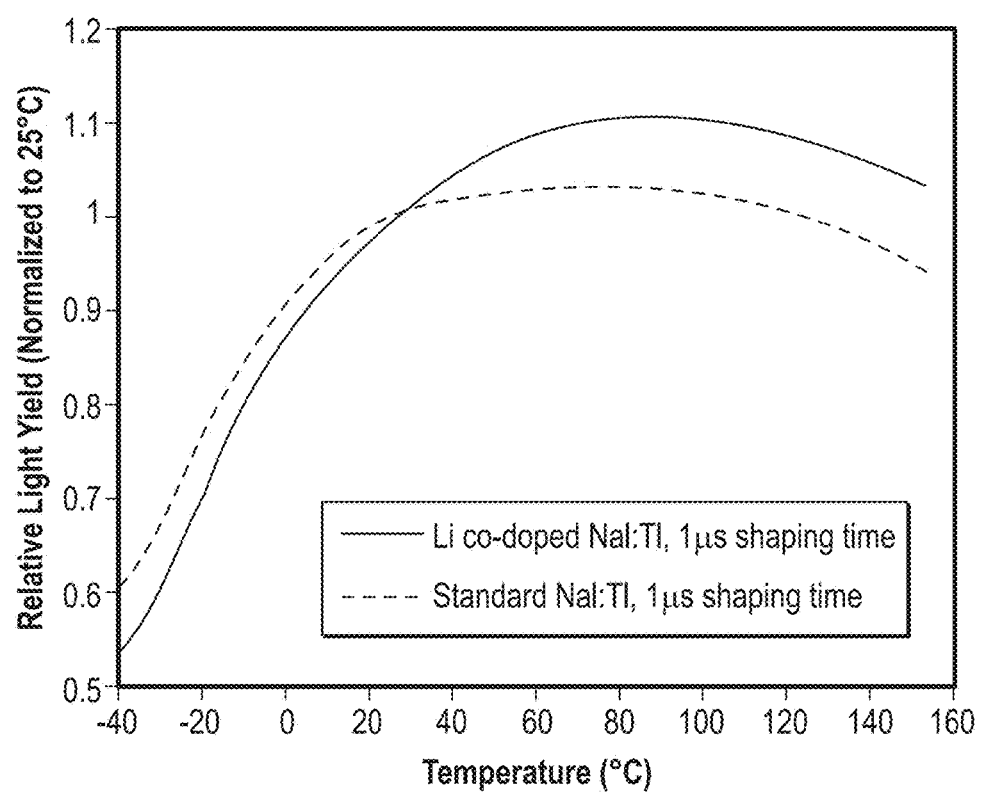
FIG. 9 includes a plot of relative light yield over a temperature range for Samples 2 and 3 of Example 2.
Figure 10:
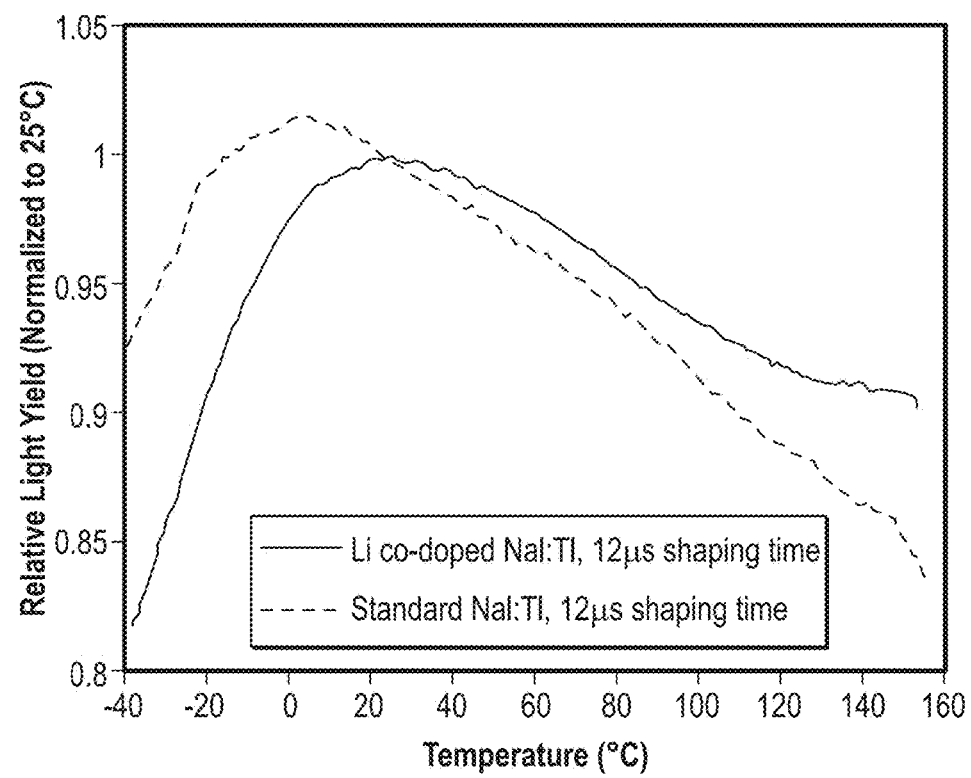
FIG. 10 includes a plot of relative light yield over a temperature range for Samples 2 and 3 of Example 2.

Data was collected on 2 samples (Samples 2 and 3). Sample 2 was a monocrystalline scintillator compound having the formula NaI (0.04 mol % Tl, 1 mol % Li) in the crystal. Sample 3 was a NaI:Tl crystal having the same concentration of Tl but without the Li co-dopant. Each of the sample scintillators was exposed to $^{252}$Cf having a mass of approximately 109 nanogram and placed about 30 cm from the scintillator. A quartz light pipe was used between the crystal and the PMT. This configuration was less efficient than the configuration in Example 1 without the quartz light pipe, and reduced the measured PSD FoM by 50% (see Menge et al., Nuclear Science Symposium and Medical Imaging Conference (NSS/MIC), 2011IEEE, pp. 1598, 1601, Oct. 2011.). The exposure was performed at a temperature in a range of from −40° C. to about 160° C. FIG. 8 includes a plot of estimated PSD FOM for such temperature range for Sample 2 and represents 2 times the measured value to account for the reduced efficiency due to the light pipe. FIG. 9 includes a plot of Relative Light Yield (normalized to 25° C.) along the given temperature range with a shaping time of 1 μs for Samples 2 and 3. FIG. 10 includes a plot of Relative Light Yield (normalized to 25° C.) along the given temperature range with a shaping time of 12 μs for Samples 2 and 3.

As can be seen from FIG. 8, the PSD FOM is greater than 2 from about −10° C. to about 150° C. Further, the PSD FOM increases significantly at around 25° C. and is greater than 3.2 from about 50° C. to about 110° C. Thus, co-doping NaI:Tl with Li can make dual mode detection possible.

As can be seen from FIGS. 9 and 10, the Relative Light Yield of Sample 2, the Li co-doped NaI:Tl compound, shows less of a decrease than Sample 3, the standard NaI:Tl scintillator compound, from 25° C. to well above 140° C. Thus, the scintillator compound including NaI:Tl co-doped with Li performs better, especially at high temperatures, than the scintillator compound including standard NAI:Tl.

Example 3

Figure 11:
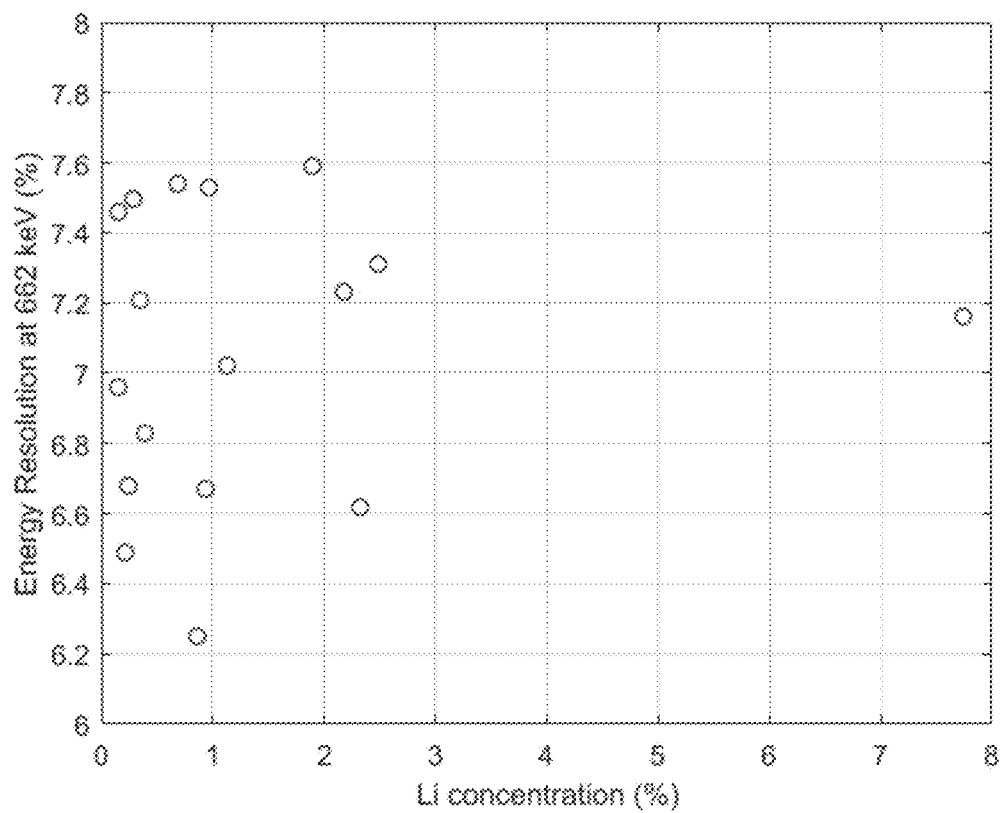
FIG. 11 includes a plot of energy resolution over Li concentration for Example 3.

Data was collected on a number of samples of a NaI:Tl scintillator compound co-doped with Li. The Tl concentration was the same as the previous examples and was consistent for each of the samples. The Li concentration for each sample was modified in a range of greater than 0 mol % to about 8 mol %. Each sample was exposed to $^{252}$Cf having a mass of approximately 109 nanogram and placed about 30 cm from the scintillator. The energy resolution was measured at 662 keV and was plotted against Li concentration in FIG. 11.

Example 4

Figure 12:
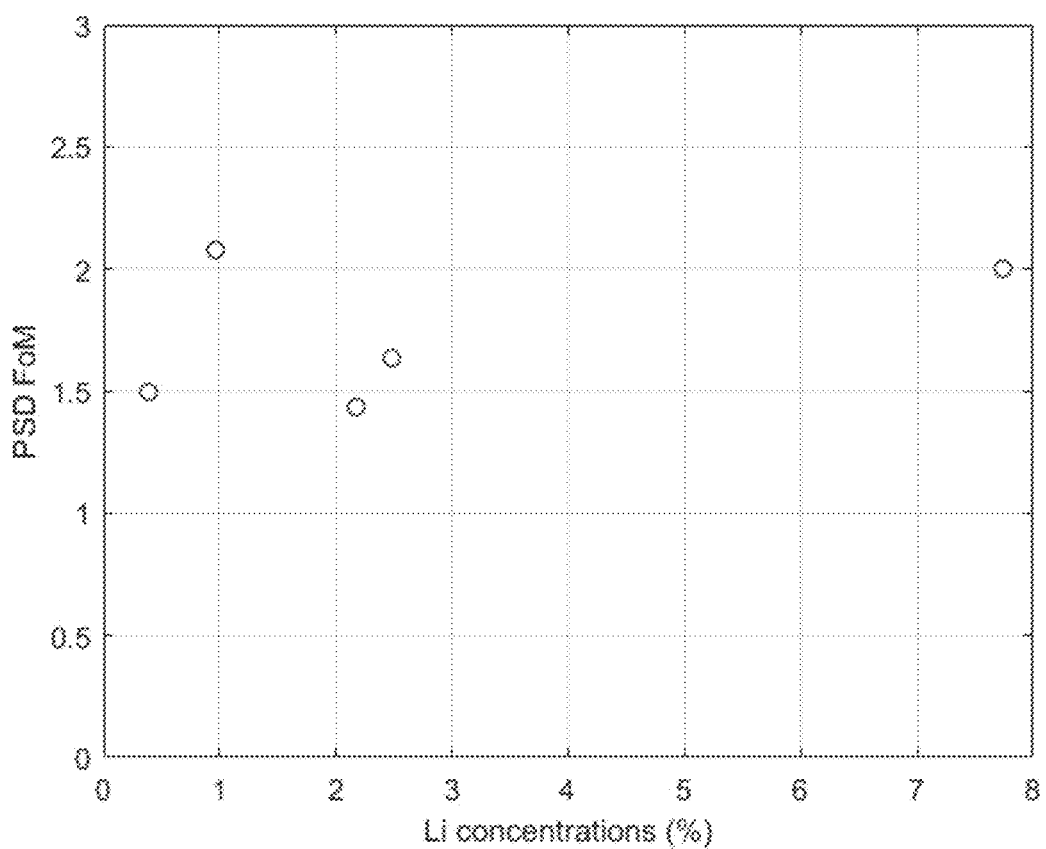
FIG. 12 includes a plot of pulse shape discrimination over Li concentration for Example 4.

Data was collected on a number of samples of a NaI:Tl scintillator compound co-doped with Li. The Tl concentration was the same as the previous examples and was consistent for each of the samples. The Li concentration for each sample was modified in a range of greater than 0 mol % to about 8 mol %. Each sample was exposed to $^{252}$Cf having a mass of approximately 109 nanogram and placed about 30 cm from the scintillator. The PSD FOM was measured at a temperature of about 25° C. and was plotted against the Li concentration of each sample in FIG. 12.

Note that not all of the activities described above in the general description or the examples are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Certain features, that are for clarity, described herein in the context of separate embodiments, may also be provided in combination in a single embodiment. Conversely, various features that are, for brevity, described in the context of a single embodiment, may also be provided separately or in a subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A scintillator comprising a monocrystalline compound having a general formula $Na_{(1-y)}Li_yX$, where $0<y\leq0.1$ and X is at least one halogen or any combination of halogens.

2. The scintillator of claim 1, wherein y is at least 0.005.

3. The scintillator of claim 1, wherein y is at most 0.08.

4. The scintillator of claim 3, wherein thallium is the only activator dopant.

5. The scintillator of claim 3, wherein europium is the only activator dopant.

6. The scintillator of claim 1, wherein the scintillator includes additional dopants comprising at least one of K, Rb, Cs, Mg, Ca, Sr, Ba, and any combination thereof.

7. The scintillator of claim 1, further comprising an activator dopant present in an amount of at least 0.03%.

8. The scintillator of claim 1, wherein the scintillator has a volume of at least 500 cm$^3$.

9. The scintillator of claim 1, wherein the scintillator has a Pulse Shape Discrimination Figure of Merit of at least 1 at a temperature of 25° C.

10. The scintillator of claim 1, wherein the scintillator has a Pulse Shape Discrimination Figure of Merit of at least 1 at a temperature of 150° C.

11. The scintillator of claim 1, wherein the scintillator has a volume of at least 500 cm$^3$.

12. A radiation detector comprising the scintillator of claim 1, wherein the radiation detector is a dual mode radiation detector.

13. The radiation detector of claim 12, wherein the radiation detector is at least part of a security detection apparatus, an oil well-logging detector apparatus, a gamma ray spectroscopy apparatus, an isotope identification apparatus, a public area detector apparatus, a large area survey apparatus, a baggage and cargo scanning apparatus, a Single Positron Emission Computer Tomography (SPECT) apparatus or a Positron Emission Tomography (PET) apparatus, an x-ray imaging apparatus, a portal monitor radiation detector apparatus, a handheld radiation detector apparatus, a personal radiation detector apparatus.

14. A scintillator having a Pulse Shape Discrimination Figure of Merit of at least 1.5 at a temperature of 25° C., wherein the scintillator has a general formula $Na_{(1-y)}Li_yX$, where $0<y<1$ and X is at least one halogen or any combination of halogens.

15. The scintillator of claim 14, wherein the scintillator has a Pulse Shape Discrimination Figure of Merit of at least 1 at a temperature of 150° C.

16. The scintillator of claim 14, wherein the scintillator has a volume of at least 2000 cm$^3$.

17. A scintillator having a Pulse Shape Discrimination Figure of Merit of at least 1.5 at a temperature of 150° C.

18. The scintillator of claim 17, wherein the scintillator has a general formula $Na_{(1-y)}Li_yX$, where $0<y\leq0.1$ and X is at least one halogen or any combination of halogens.

19. The scintillator of claim 17, wherein the scintillator has a volume of at least 2000 cm$^3$.

* * * * *

UNITED STATES PATENT AND TRADEMARK OFFICE
CERTIFICATE OF CORRECTION

PATENT NO. : 10,053,623 B2
APPLICATION NO. : 15/474230
DATED : August 21, 2018
INVENTOR(S) : Kan Yang et al.

It is certified that error appears in the above-identified patent and that said Letters Patent is hereby corrected as shown below:

In the Claims

Column 17, Line 18, please replace "amount of at least 0.03%" with --amount of at least 0.03 mol%--.

Column 18, Line 25, please replace "formula $Na_{(1\ y)}Li_yX$" with --formula $Na_{(1-y)}Li_yX$--.

Signed and Sealed this
Eleventh Day of December, 2018

Andrei Iancu
*Director of the United States Patent and Trademark Office*